March 30, 1943.                L. PETERSON                2,315,130
CLUTCH CONSTRUCTION
Filed April 28, 1941

Inventor
Louis Peterson
By Williamson & Williamson
Attorneys

Patented Mar. 30, 1943

2,315,130

UNITED STATES PATENT OFFICE 2,315,130

CLUTCH CONSTRUCTION

Louis Peterson, Minneapolis, Minn.

Application April 28, 1941, Serial No. 390,790

2 Claims. (Cl. 192—58)

This invention relates to clutch devices and is particularly adaptable for use in connecting a power device to apparatus to be driven wherein the power device must build up speed gradually against the resistance of the apparatus being driven. One specific application is in the driving of cream separators with electric motors. There is considerable resistance to the motor when the speed of the separator is being built up and if a direct drive connection were used it would overload the motor and burn it out. Variable resistance motors can be used but they are more costly than conventional motors.

Hydraulic clutches have been used as drive connections in cases such as set forth above, but experience has shown that even with the most efficient of hydraulic clutches there is slippage at regular operating speeds except when added structure is used. Substantially fully efficient hydraulic clutches are relatively complex and costly.

This is a continuation in part of my previously filed application, Serial Number 368,865, filed December 6, 1940, for patent on Hydraulic clutch.

It is a general object of my invention to provide a clutch construction employing two relatively movable elements which operate similarly to a hydraulic clutch, but which utilizes finely divided powdered substances instead of liquids. Actual use of powder filled clutches has shown that they have the flexibility of hydraulic clutches but do not slip when the prime mover and its connected apparatus have reached their proper running speed.

It is another object of the invention to provide an improved form of clutch construction which is particularly adaptable for use with a powder.

These and other objects and advantages of the invention will more fully appear from the following description made in connection with the accompanying drawing, wherein like reference characters refer to the same parts throughout the views, and, in which.

Figure 1:
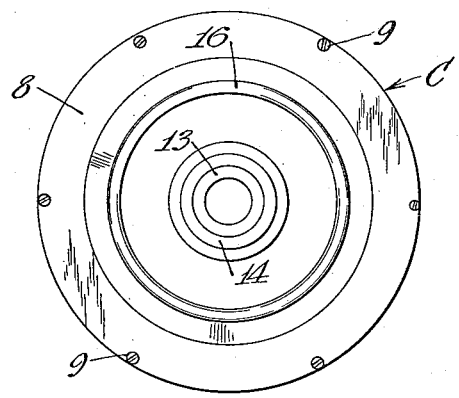
Fig. 1 is a plan view of an embodiment of my invention.
Figure 2:
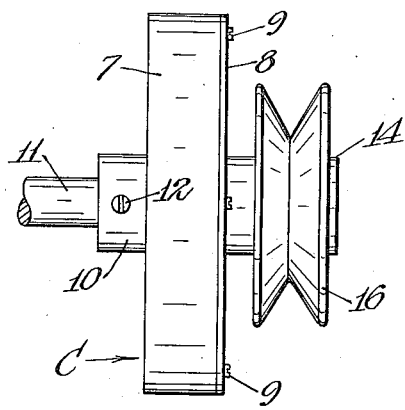
Fig. 2 is a side elevation thereof.

In the drawing there is shown a casing C having a side wall 6 and an integrally connected circumferential wall 7. The other casing side wall 8 is removably secured to the edge of the circumferential wall 7 by means of suitable studs 9. The side wall 6 is provided with a central hub 10 adapted to receive a shaft 11 held in place by a set screw 12 in said hub. The shaft 11 may be a portion of a mechanism desired to be driven.

The casing hub 10 is extended through the casing and outwardly from the opposite side thereof in the form of a sleeve 13 upon which is rotatably mounted a sleeve 14 which extends into the casing through a suitable aperture in the casing cover plate or side wall 8 and which at its inner end carries a rotor 15. The rotor is adapted to revolve on the sleeve 13 as a bearing, and the rotor sleeve 14 provides a drive connection and may have a pulley 16 secured thereto as by the set screw 16a shown in Fig. 4.

Figure 3:
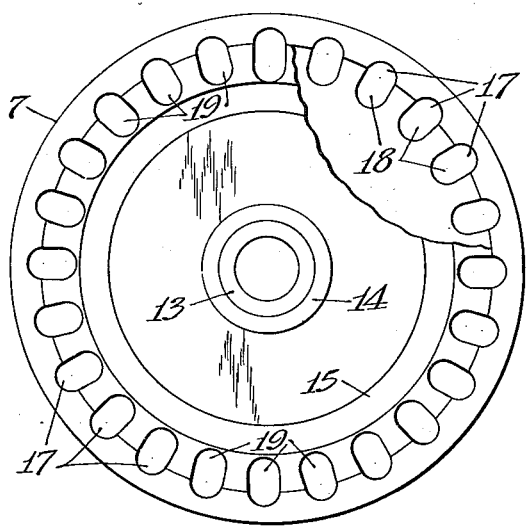
Fig. 3 is an enlarged view of the mechanism with a casing side plate removed and a portion of the rotor broken away.

The inner face of the circumferential casing wall 7 is provided with a plurality of relatively shallow elongated pockets 17 which extend across the width of the casing and are rounded in cross section. Furthermore, as shown in Figs. 3 and 4, the casing side wall 6 is provided with a plurality of relatively shallow depressions or cut-outs 18, each of which communicates with one of the pockets 17.

Figure 4:
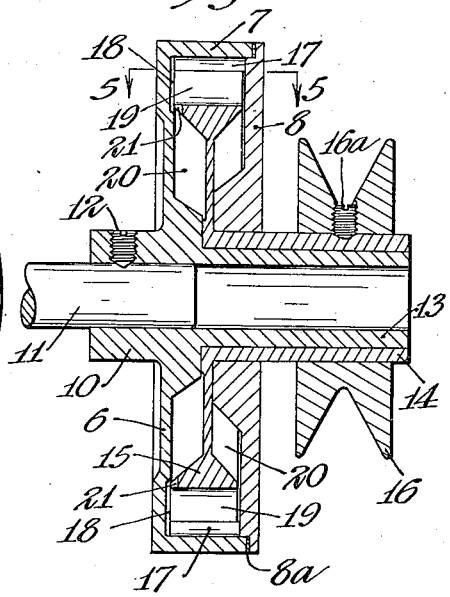
Fig. 4 is a longitudinal vertical section through the apparatus.
Figure 5:
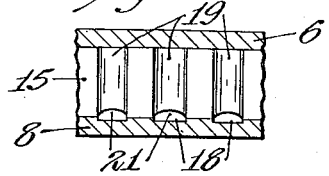
Fig. 5 is a fragmentary section taken approximately on the line 5—5 of Fig. 4.

The rotor 15, as best indicated in Fig. 4, is provided with a circumferential rim having a series of relatively deep pockets 19 formed inwardly from its circumferential face, and these pockets 19 are also rounded at their bottoms and are preferably co-extensive in length and breadth with the pockets 17 in the casing. It will be seen that the cut-out portions and the side wall 6 of the casing extend below the widened rim portion of the rotor 15 to communicate with the space 20 in the inner central portion of the casing inwardly from said rotor rim. The rotor rim is also provided with small cut-out portions 21 which further afford communication between the rotor pockets 19 and the casing space or chamber 20.

The rotor rim, as viewed in Fig. 4, is shown spaced somewhat from the removable casing side wall 8 to further permit the flow of powder from the pockets 17 and 19 into the space 20 in the inner portion of the casing.

When the device has been assembled a quantity of suitable powder is placed in the casing and the cover plate or casing side wall 8 is secured to the circumferential wall 7 and preferably a sealing gasket 8a is utilized to prevent moisture from entering. The casing hub 10 is connected to a shaft such as the shaft 11 and a belt may be used to connect the pulley 16 on the rotor sleeve 14 with a source of power such as an electric motor.

When the motor is energized it will cause the rotor 15 to rotate on the casing sleeve 13 and due to the fact that the casing is only partially filled with a powder, much of it will be picked up and retained in the rotor pockets 19 and at slow speeds that powder which falls from the pockets passes through the cut-out portion of the casing side wall 6 and the cut-out portions 21 of the rotor and fall back into the chamber 20 in the inner portion of the casing. As the speed of the driving motor picks up, however, powder will be picked up in the rotor pockets 19 and then thrown outwardly due to centrifugal force and against the wall of the casing pockets 17.

As the driving motor and rotor attain a relatively high speed, the powder is thrown into and against the walls of the casing pockets 17 with increasingly greater force and due to centrifugal action more and more powder is retained in the rotor pockets and casing pockets. Finally the casing and apparatus which is drivingly connected thereto will attain the speed of the motor and rotor and the accumulation of powder in the composite chambers formed by the two sets of pockets will be increased.

While with a hydraulic clutch there will be some slippage at any speed the powder will pack in the casing pockets 17 and sufficient powder is utilized to cause a relatively tightly packed accumulation which also lies partially in the rotor cups 19. Due to the solidity of the powdered material it will not yield and permit slippage as is the case with liquids, but as it becomes packed under centrifugal force it will positively lock the rotor and casing together. However, when the power unit such as an electric motor is shut off there will be sufficient freedom of movement between the two parts to permit one of the driving or driven units to continue to move relative to the other. The powder easily loosens and does not remain in compacted masses.

The particular powder used must, of course, be non-abrasive and the particles cannot be such that they will stick together and remain in hard lumps and masses. It should, of course, be dry and the casing properly sealed to prevent the admission of moisture. One form of powder which I have found to be highly successful is talc.

While some powder will flow from the pockets when the rotor is moving slowly and the casing is stationary or nearly so, there will be a reversal of the flow from the inner space 20 in the casing to the pockets through the cut away portions 18 of the casing side wall 6 and the cut away portions 21 in the rotor rim. With the correct amount of powder in the casing all of the pockets will be substantially filled when top speed is approached and reached and due to centrifugal force the rotor and casing will be effectively locked together.

Another great advantage in the use of a powder rather than a liquid such as oil is the fact that the powder is unaffected by temperatures. With oil filled clutches the liquid becomes considerably more viscous in colder temperatures, and the operation of the clutch consequently varies. Powder will cause the clutch to operate with the same degree of freedom when started regardless of the temperature.

From the foregoing description it will be seen that I have provided a relatively simply constructed yet highly efficient clutch for use between a power device and a driven device. The device is compact in structure and there is no attention required from a maintenance standpoint.

It will, of course, be understood that while I have suggested that the invention is of particular advantage in the driving of cream separators with electric motors it can also be applied to other mechanism and uses, and it should be further understood that various changes may be made in the form, details, arrangement and proportions of the various parts without departing from the scope of my invention.

What is claimed is:

1. In a clutch construction, a casing mounted for rotation and adapted to hold a yielding powder transmitting medium therein, said casing having a plurality of pockets about its inner circumferential wall and a relatively movable rotor in said casing having a drive connection extending outwardly therefrom, said rotor having a plurality of pockets in its outer circumferential face, the side portions of said rotor adjacent said rotor pockets lying closely adjacent the side walls of said casing, said casing having open central portions adjacent the axis of said rotor defining powder holding spaces, and said casing having conduits formed therein affording communication between said casing pockets and the open central portions of the casing.

2. In a clutch construction, a casing mounted for rotation and adapted to hold a yielding powder transmitting medium therein, said casing having open central portions defining powder holding spaces and having a plurality of pockets about its inner circumferential wall, a relatively movable rotor in said casing having a widened rim portion, said rim portion having pockets formed therein about its circumferential face and lying closely adjacent the pockets of said casing, and said rim portion being cut away at a side thereof adjacent said rotor pockets to afford flow communication from said casing and rotor pockets to the open central portions of said casing.

LOUIS PETERSON.